G. RIPMA.
AUTOMATIC COUPLING FOR AIR BRAKES.
APPLICATION FILED JUNE 15, 1908.
914,512.
Patented Mar. 9, 1909.
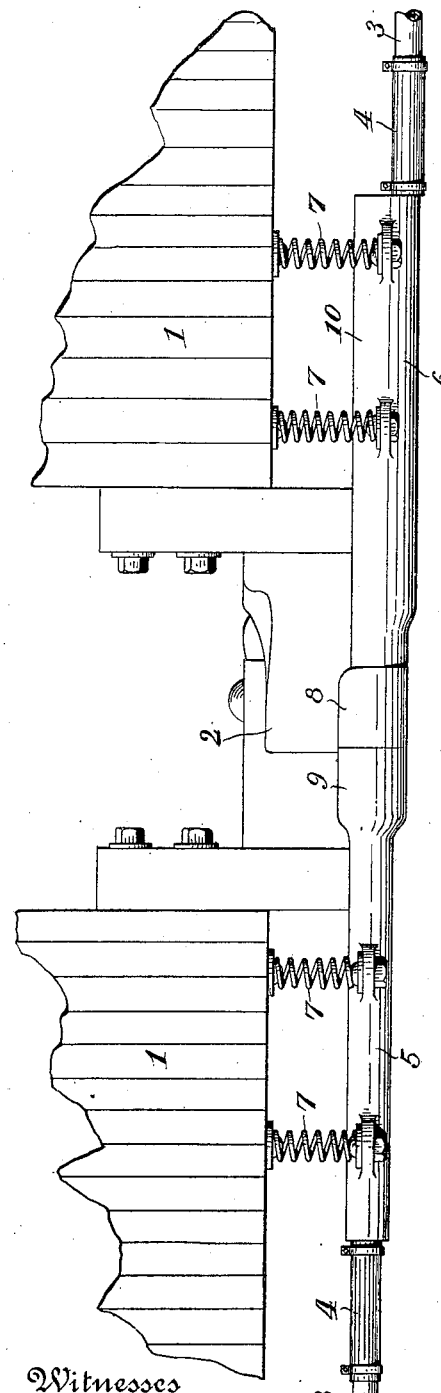
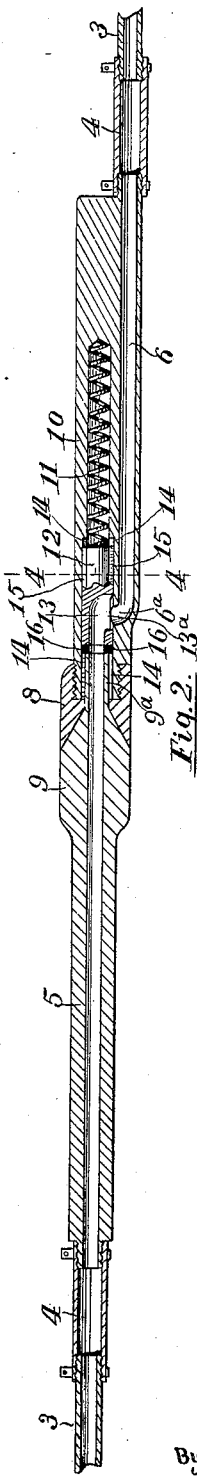
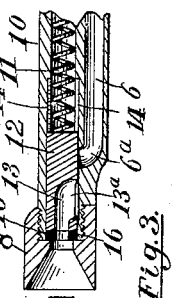
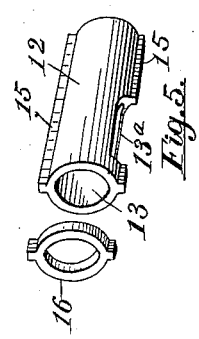
Witnesses
Inventor
George Ripma
By Luther V. Moulton
Attorney

UNITED STATES PATENT OFFICE.

GEORGE RIPMA, OF GRAND RAPIDS, MICHIGAN.

AUTOMATIC COUPLING FOR AIR-BRAKES.

No. 914,512.      Specification of Letters Patent.      Patented March 9, 1909.

Application filed June 15, 1908. Serial No. 438,600.

*To all whom it may concern:*

Be it known that I, GEORGE RIPMA, a citizen of the United States of America, residing at Grand Rapids, in the county of Kent and State of Michigan, have invented certain new and useful Improvements in Automatic Couplings for Air-Brakes; and I do hereby declare the following to be a full, clear, and exact description of the invention, such as will enable others skilled in the art to which it appertains to make and use the same.

My invention relates to improvements in automatic couplings for air brakes on railway trains and its object is to provide the same with various new and useful features hereinafter more fully described and particularly pointed out in the claims, reference being had to the accompanying drawings, in which:

Figure 1 is a side elevation of a device embodying my invention; Fig. 2 a longitudinal vertical section of the same; Fig. 3 a detail showing the device uncoupled; Fig. 4 a transverse section on the line 4—4 of Fig. 2; and, Fig. 5 an enlarged detail of the valve and packing for the same.

Like numbers refer to like parts in all of the figures.

1—1 represent portions of two adjacent cars; 2 any convenient coupling for the same; 3 air pipe for the brakes; 4 short sections of flexible and elastic pipe, preferably elastic rubber hose connecting the pipe 3 with the terminal couplings 5 and 6. These couplings are supported by springs 7 connecting the same to the bottom of the respective cars whereby they will yield in all directions to both longitudinal and lateral strains and will remain normally in alinement and adapted to automatically couple and uncouple. The coupling 6 which for convenience is termed the female member is provided with a detachable end 8 having a truncated conical opening to receive the end 9ᵃ of the member 5, which is called the male member of the coupling. This male member has a reduced end 9ᵃ adapted to enter and pass through an axial opening in the end 8, and a truncated conical enlargement 9 adapted to fit within the conical part of the said end. The member 6 has an air passage therethrough below the axis and laterally turned near the end as at 6ᵃ and opening into a longitudinal chamber in which is a valve 12 longitudinally movable therein and having an axial opening 13 in its outer end communicating with a lateral opening 13ᵃ adapted to register with the laterally open end 6ᵃ of the air passage when the valve is moved inward by the end 9ᵃ of the member 5. To prevent this valve from rotating it is provided with one or more longitudinal ribs 15 each traversing a groove 14 in the wall of the opening in which it is movable. The upper part 10 of the member 6 is further chambered to receive a spring 11, which forces the valve 12 toward the end of the member and against the end 8 and thus automatically closes the air passage when the device is uncoupled. An air tight joint is formed between the end 9ᵃ of the member 5 and this valve by means of an elastic washer 16 on the end of the valve. The detachable end 8 projects inward in front of the margins of the valve and thus retains the same in place when the device is uncoupled.

What I claim is:

1. A hose coupling for air brakes, comprising a coupling member having an air passage laterally turned at the end, and communicating with a longitudinal chamber in said member open at the outer end only, a second coupling member adapted to enter said chamber, a longitudinally movable valve in said chamber closed at the inner end having an axial opening in the outer end communicating with the said second coupling member, and a lateral opening communicating with the laterally turned end of the air passage, said valve also adapted to close said passage, and a spring to move said valve to closing position.

2. A hose coupling for air brakes, comprising a coupling member having an air passage and also having a longitudinal chamber open at the outer end only, and communicating laterally with said passage, an end member detachably secured thereto and having a conical opening and an axial opening opposite said chamber, a valve movable in said chamber closed at the inner end and having an end opening registering with the axial opening in the detachable end, and a lateral opening adapted to register and communicate with the end of the air passage when the valve is moved inward, a spring in said chamber to move the valve against the detachable end and close said air passage, and a second coupling member adapted to enter said end and engage the valve to move the same inward and open the air passage.

3. A coupling for air brakes, comprising a coupling member having a longitudinal chamber open at the end and provided with a longitudinal groove in the wall of said chamber, a valve movable in said chamber and having a rib slidable in said groove and also having an end opening and a lateral opening communicating therewith, said coupling member also having an air passage therethrough communicating with said chamber and registering with the lateral opening of the valve when the said valve is moved inward and closed by the valve when the valve is moved outward, a spring to move the valve outward, and a second coupling member adapted to engage the valve and move the same inward and having an air passage therethrough registering with the end opening of the valve.

4. A hose coupling for air brakes, comprising two coupling members, springs supporting said members and yieldable in all directions, elastic and flexible sections of hose connecting said members with air pipes, one of said members having a longitudinal chamber open at the end and an air passage communicating with the hose at one end and communicating laterally with said chamber, a valve movable in the chamber and having an end opening and a lateral opening communicating therewith and with the air passage when the valve is moved inward, an annular packing on the end of the valve, a spring to move the valve outward, a rib on the valve traversing a groove in the wall of the chamber, a truncated conical end on the said member having a central opening registering with the end opening in the valve, and a second coupling member having a reduced end and a conical enlargement to enter the conical end of the other member to engage and move the valve.

In testimony whereof I affix my signature in presence of two witnesses.

GEORGE RIPMA.

Witnesses:
GEORGIANA CHACE,
L. V. MOULTON.